F. ROGERS.
COLLAPSIBLE RIM.
APPLICATION FILED MAY 20, 1916.
1,220,004.
Patented Mar. 20, 1917.
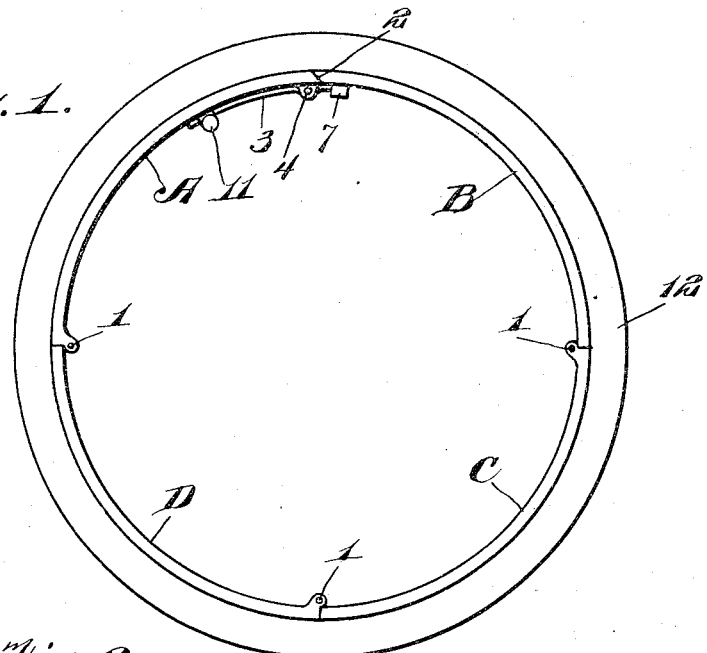
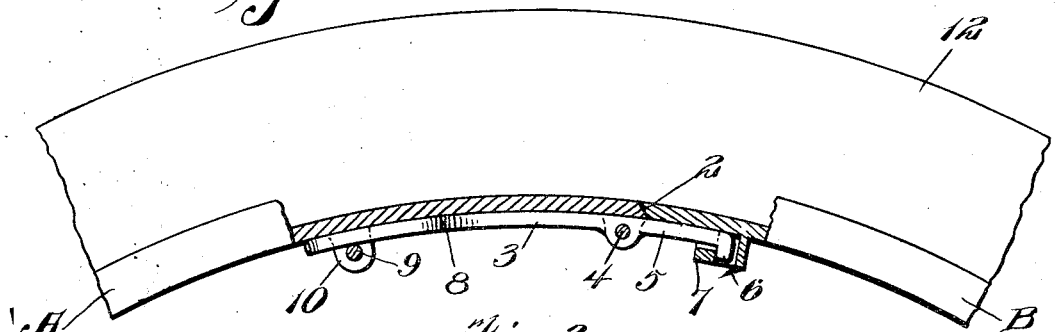
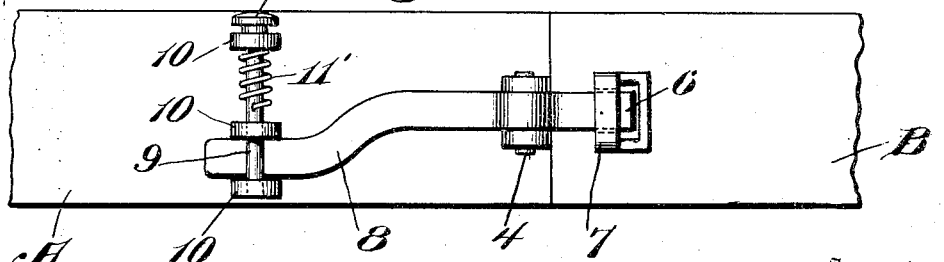
Inventor
F. Rogers
Witnesses
By Victor J. Evans
Attorney

UNITED STATES PATENT OFFICE.

FRANCIS ROGERS, OF GALVESTON, TEXAS.

COLLAPSIBLE RIM.

1,220,004.  Specification of Letters Patent.  Patented Mar. 20, 1917.

Application filed May 20, 1916. Serial No. 98,930.

*To all whom it may concern:*

Be it known that I, FRANCIS ROGERS, a citizen of the United States, residing at Galveston, in the county of Galveston and State of Texas, have invented new and useful Improvements in Collapsible Rims, of which the following is a specification.

This invention relates to collapsible rims for vehicles and particularly motor driven vehicles, the object in view being to produce a rim which after being removed from a wheel, may be collapsed so that it may be readily disconnected from the tire and again connected therewith whenever it is necessary to remove or replace a tire.

One of the principal objects of the present invention is to provide in connection with a rim embodying a plurality of hingedly connected sections, a lever having a novel relation to two adjoining sections of the rim whereby by swinging said lever in one direction, the extremities of the sections adjacent to the joint in the rim may be pried apart or moved out of alinement with each other, and by a reverse movement of said lever, the extremities of the rim adjacent to the joint may be forced into alinement with each other, means being additionally provided to prevent movement of said lever and relative movement between the extremities of the rim adjacent to the joint, when said lever is in its normal locking position.

With the above and other objects in view, the invention consists in the novel construction, combination and arrangement of parts, as herein described, illustrated and claimed.

In the accompanying drawings:—

Figure 1 is a side elevation of a tire and rim illustrating the present invention.

Fig. 2 is an enlarged fragmentary view partly in side elevation and partly in section illustrating the relation between the operating lever and the extremities of the rim adjacent to the joint in the rim.

Fig. 3 is a fragmentary inner face view of the same.

The rim contemplated in this invention comprises a plurality of sections A, B, C and D, the sections A and B being connected by knuckle hinges 1 to the sections C and D, and the last named sections being hingedly connected in the same manner at 1. The adjacent extremities of the sections A and B form a butt joint at 2 so that one of the sections A may be moved inwardly or outwardly relatively to the extremity of the section B.

3 designates a lever which is connected by a pivot 4 to the inner face of the section A of the rim immediately adjacent to the joint 2. Said lever 3 comprises a short arm 5 terminating in a shallow hook or inwardly extending lip 6 which is adapted to pass through a keeper 7 in the form of a loop extending inwardly from the adjacent rim section B near the joint 2. The longer arm of the lever 3 is offset laterally to one side as shown at 8 so as to be engaged and disengaged by a locking member 9 shown in the form of a bolt or rod extending transversely of the inner face of the section A of the rim and slidable through a plurality of guides 10. The locking member 9 is provided with a head 11 and is normally held inwardly in the position shown in Fig. 3 by means of a spring 11 coiled around the member 9.

From the foregoing description, taken in connection with the accompanying drawings, it will now be understood that in order to collapse the rim, the locking member 9 is moved to a position to release the longer arm of the lever 3. Said arm of the lever is then swung inwardly away from the section A of the rim thereby causing the shorter arm 5 of said lever to press outwardly against the end of the section B adjacent to the joint 2. As the end of the section B cannot move outwardly due to the resistance of the tire 12, the abutting end of the section A must therefore move inwardly and in such movement, the shorter arm of the lever 3 moves out of engagement with the keeper 7. After this is accomplished, the several sections of the rim may be folded inwardly on their hinged connection with each other thereby releasing the tire 12. To again connect the tire and rim, the operation above described is reversed, the longer arm of the lever 3 being pressed toward the rim until the shorter arm 5 has been forced under and through the keeper 7 and brought to the position illustrated in Fig. 2.

I claim:

A tire carrying rim embodying a plurality of arcuate sections hinged together and collectively forming a complete annular rim transversely split at one point to form a butt joint, a keeper loop on the inner face of the rim adjacent to and at one side of said joint, and a joint breaking and closing lever pivoted and conforming in curvature to the inner face of the rim at the opposite side of said joint and comprising long and short arms, the short arm being insertible through and removable from said keeper by swinging the lever on its pivotal connection with the rim.

FRANCIS ROGERS.